United States Patent
Gopalan et al.

(10) Patent No.: US 9,720,782 B2
(45) Date of Patent: Aug. 1, 2017

(54) AUTHENTICATING A BACKUP IMAGE WITH BIFURCATED STORAGE

(75) Inventors: Yadhu Nandh Gopalan, Issaquah, WA (US); Andrew Michael Rogers, Bellevue, WA (US); David M. Callaghan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1466 days.

(21) Appl. No.: 12/329,638

(22) Filed: Dec. 8, 2008

(65) Prior Publication Data

US 2010/0146231 A1     Jun. 10, 2010

(51) Int. Cl.
*G06F 9/44* (2006.01)
*G06F 11/14* (2006.01)
*G06F 21/64* (2013.01)

(52) U.S. Cl.
CPC ...... *G06F 11/1458* (2013.01); *G06F 11/1469* (2013.01); *G06F 11/1433* (2013.01); *G06F 21/64* (2013.01)

(58) Field of Classification Search
CPC ... G06F 8/60; G06F 11/14; G06F 8/61; G06F 8/65; G06F 8/67
USPC ................................ 717/172; 711/161, 162
See application file for complete search history.

(56) References Cited

U.S. PATENT DOCUMENTS

| | | | |
|---|---|---|---|
| 7,134,041 B2 | 11/2006 | Murray et al. | |
| 7,330,977 B2 | 2/2008 | Cromer et al. | |
| 7,421,551 B2 | 9/2008 | Desai et al. | |
| 7,900,002 B2 * | 3/2011 | Lyon | 711/161 |
| 8,051,043 B2 * | 11/2011 | Young | 707/646 |
| 8,117,163 B2 * | 2/2012 | Brown et al. | 707/640 |
| 8,117,667 B2 * | 2/2012 | Merkle et al. | 726/29 |
| 8,560,823 B1 * | 10/2013 | Aytek | G06F 8/665 |
| | | | 713/191 |
| 2002/0010910 A1 * | 1/2002 | Crudele et al. | 717/4 |
| 2002/0073106 A1 * | 6/2002 | Parker et al. | 707/200 |
| 2005/0076262 A1 * | 4/2005 | Rowan et al. | 714/6 |
| 2005/0132179 A1 * | 6/2005 | Glaum et al. | 713/1 |
| 2005/0283662 A1 | 12/2005 | Li et al. | |
| 2006/0218203 A1 * | 9/2006 | Yamato et al. | 707/200 |
| 2007/0083722 A1 * | 4/2007 | Per et al. | 711/162 |
| 2007/0100913 A1 * | 5/2007 | Sumner et al. | 707/204 |

(Continued)

OTHER PUBLICATIONS

"BSP", Retrieved at <<http://channel9.msdn.com/wiki/cedeveloper/bsp/>>, Sep. 17, 2008, pp. 1-2.

(Continued)

*Primary Examiner* — Hang Pan

(57) ABSTRACT

Authenticating a backup image stored on a storage device prior to restoring the backup image. A value such as a hash value is generated based on the image to be preserved. The value is stored on the storage device in a first area accessible for writing only when the computing device is in an update mode. The first area becomes read-only when the computing device is in an operating system mode. The image is stored on the storage device in a second area accessible for writing when the computing device is in the update mode or the operating system mode. When attempting to restore the image from the second area, the value from the first area is compared to another value generated at the time of the restoration for validation.

20 Claims, 7 Drawing Sheets

(56) References Cited

U.S. PATENT DOCUMENTS

| | | | |
|---|---|---|---|
| 2007/0186066 A1* | 8/2007 | Desai et al. | 711/162 |
| 2007/0186127 A1* | 8/2007 | Desai et al. | 714/13 |
| 2007/0244920 A1* | 10/2007 | Palliyil et al. | 707/102 |
| 2007/0245104 A1* | 10/2007 | Lindemann et al. | 711/162 |
| 2007/0250671 A1* | 10/2007 | Lyon | 711/162 |
| 2008/0016127 A1* | 1/2008 | Field | 707/202 |
| 2008/0104443 A1* | 5/2008 | Akutsu et al. | 714/6 |
| 2008/0232598 A1* | 9/2008 | Vennelakanti et al. | 380/279 |
| 2008/0243879 A1* | 10/2008 | Gokhale et al. | 707/100 |
| 2008/0243914 A1* | 10/2008 | Prahlad et al. | 707/103 Y |
| 2008/0244172 A1* | 10/2008 | Kano | 711/112 |
| 2008/0244270 A1* | 10/2008 | Zimmels et al. | 713/176 |
| 2008/0250082 A1* | 10/2008 | Dive-Reclus | 707/204 |
| 2008/0256315 A1* | 10/2008 | Awai | 711/162 |
| 2009/0019551 A1* | 1/2009 | Haga et al. | 726/27 |
| 2009/0052669 A1* | 2/2009 | Ma | 380/277 |
| 2009/0210456 A1* | 8/2009 | Subramaniam | 707/202 |
| 2010/0011368 A1* | 1/2010 | Arakawa et al. | 718/104 |
| 2010/0057789 A1* | 3/2010 | Kawaguchi | 707/204 |
| 2011/0307675 A1* | 12/2011 | Kano | 711/162 |

OTHER PUBLICATIONS

"ApecSoft Web Flash Catcher 1.09", Retrieved at <<http://backup-your-flash.qarchive.org/>>, Sep. 17, 2008, pp. 1-3.

"Linear Flash Memory Devices on Microsoft Windows CE 2.1", Retrieved at <<http://msdn.microsoft.com/en-us/library/ms834188.aspx>>, Apr. 2000, pp. 1-10.

Kelley, Shawn, "Oracle Database 10g Standard Edition Real Applications Cluster (SE RAC) Backup and Recovery Procedures", Retrieved at <<http://www.dell.com/downloads/global/solutions/oracle10g_se_rac.pdf>>, Sep. 2005, pp. 48.

* cited by examiner

AUTHENTICATING A BACKUP IMAGE WITH BIFURCATED STORAGE

BACKGROUND

Some existing systems copy data from a computing device to a storage media for backup purposes. These existing systems operate responsive to a user-initiated request, or operate automatically before an update is installed on the computing device. To ensure the authenticity of the backup data, the existing systems digitally sign the backup data. In such systems, a digital key signature is stored with the backup data on the storage media. However, the key may be compromised (e.g., replaced or modified) by any user or other party as the key is stored with the backup data, and is read-write accessible by the user.

Other systems employ a server to securely store the key. This solution, however, is not feasible in computing systems that lack access to a central key repository. For example, when restoring data to a mobile computing device, the mobile computing device may not have network connectivity to access the central key repository. Without the ability to perform authentication, the user may apply unauthorized images or store unauthorized data on the mobile computing device.

SUMMARY

Embodiments of the invention enable authentication of a backup image. A computing device executes in either an operating system mode or an update mode. Responsive to an update request, the computing device enters the update mode to generate a value such as a hash value based on the image to be backed up. The value is stored in a first area accessible for writing only when the computing device is in the update mode. The image is stored in a second area accessible for writing when the computing device is in the update mode or the operating system mode. Responsive to a request to restore the backed up image, the computing device validates the value stored in the first area prior to restoring the image from the second area.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
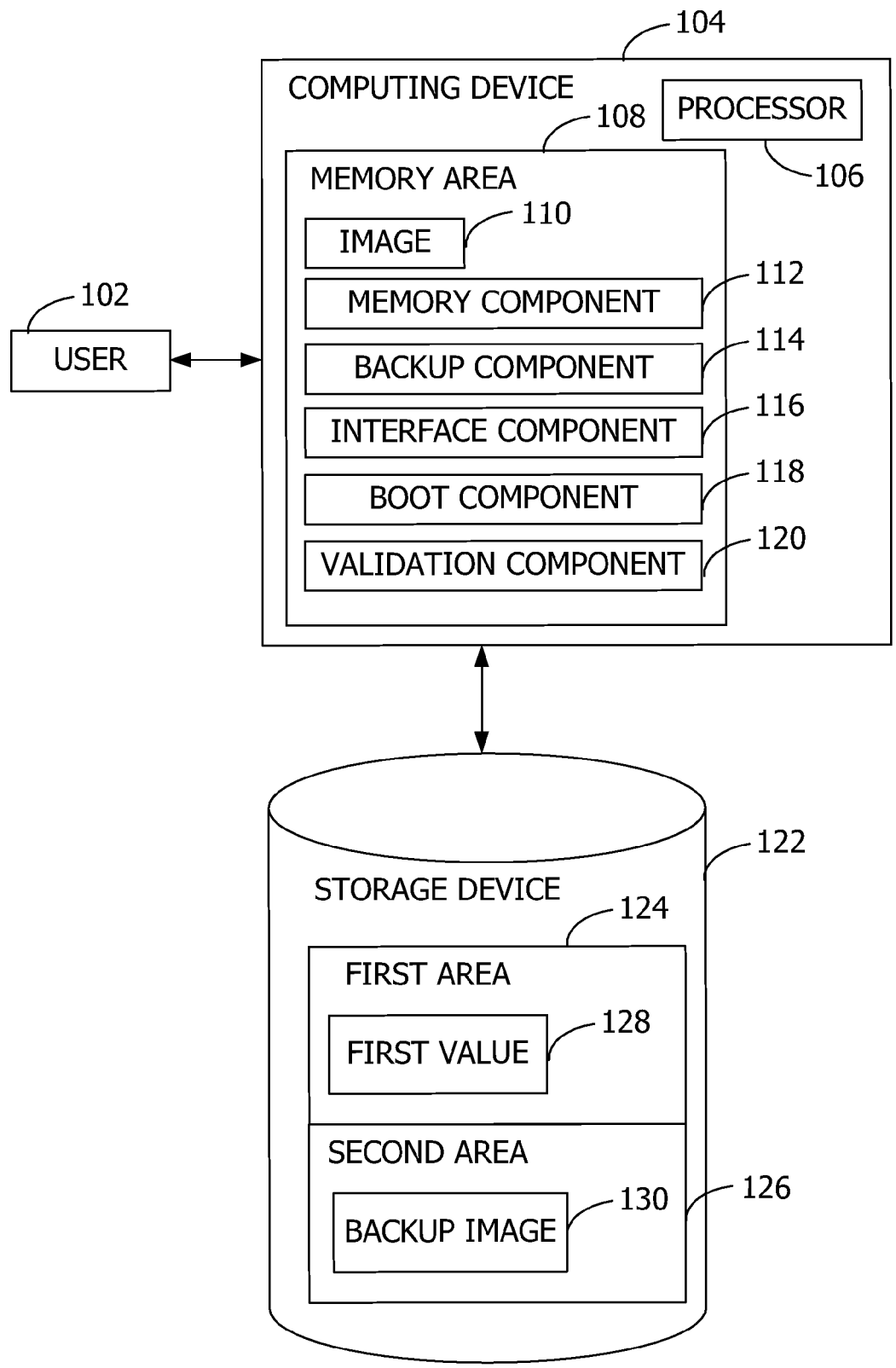
FIG. 1 illustrates an exemplary block diagram of a computing device storing data on a storage device.

Referring to FIG. 1, an exemplary block diagram illustrates a computing device 104 of a user 102 storing data on a storage device 122. The computing device 104 includes a processor 106 and a memory area 108, or other computer-readable media. The processor 106 is configured to execute operations to create a backup image 130 of an image 110 associated with the computing device 104. The backup image 130 represents at least a portion of the image 110. The image 110 represents operating system data, application data, and/or user data stored on, or accessible by, the computing device 104. The image 110 may include one or more operating systems with specialized purposes such as a main operating system used for normal device operations and a completely separate update operating system used to update the device 104. The update operating system is also described herein as an update loader. The processor 106 is further configured to confirm the authenticity of the backup image 130 before restoring at least a portion of the backup image 130 from the storage device 122 to the computing device 104. The authenticity is confirmed via a first value 128 that includes, but is not limited to, a hash value, checksum value, cyclic redundancy value (CRC), or the like.

In embodiments, the computing device 104 executes in one of at least two modes: operating system mode and an update mode. The operating system mode reflects the normal operation of the computing device 104 during which applications execute and the user 102 interacts with the computing device 104. The update mode reflects operation of the computing device 104 during which most or all of the applications are prevented from executing. The update mode corresponds to a "lockdown" mode or bootup mode during which only a limited environment exists for performing operations. During the update mode, in some embodiments, one or more updates are applied to the computing device 104.

The storage device 122 includes any removable or non-removable computer-readable media connected to the computing device 104, or within the computing device 104. For example, the storage device 122 may include, but is not limited to, a flash drive, a zip drive, a secure digital (SD) card, external hard drive, or internal memory such as chips providing random access memory. The storage device 122 is communicatively coupled to the computing device 104. For example, the storage device 122 may communicate with the computing device 104 via a universal serial bus (USB), or any other connection. The storage device 122 may also communicate with the computing device 104 via pins if the storage device 122 is inserted into the computing device 104 (not shown).

The storage device 122 generally has a plurality of memory areas. In some of the embodiments described herein, the storage device 122 is bifurcated into a first area 124 and a second area 126. The first area 124 and the second area 126 may be contiguous sections of adjacent memory, or conceptually separate areas of memory anywhere on the storage device 122. The first area 124 represents an area of memory that can be made read-only (e.g., lockable) only by certain entities executing on the computing device 104. In some of the examples described herein, the first area 124 is lockable by an update loader, boot component, or other automated routine (e.g., lacking user input during execution) such that no user 102 of the computing device 104 can write to the first area 124. Aspects of the invention are applicable in environments in which every user 102 of the computing device 104 has equal access privileges to the data stored on the storage device 122. Thus, the area of memory to be locked down is inaccessible for write operations by any of the users 102 while the computing device 104 is in the operating system mode. The second area 126 represents an area of memory that is readable and writeable by any user 102 or entity executing on the computing device 104.

In the example of FIG. 1, the first area 124 is writeable only when the computing device 104 is in the update mode. The second area 126 is writeable when the computing is in the update mode, operating system mode, or any other mode.

The memory area 108 stores computer-executable components for implementing aspects of the invention. In the embodiment of FIG. 1, the components include a memory component 112, a backup component 114, an interface component 116, a boot component 118, and a validation component 120. The components execute to generate and store the first value 128 such as a hash value in the first area 124, while the backup image 130 is stored in the second area 126. Operation of the components is further described below with reference to FIG. 7.

Figure 2:
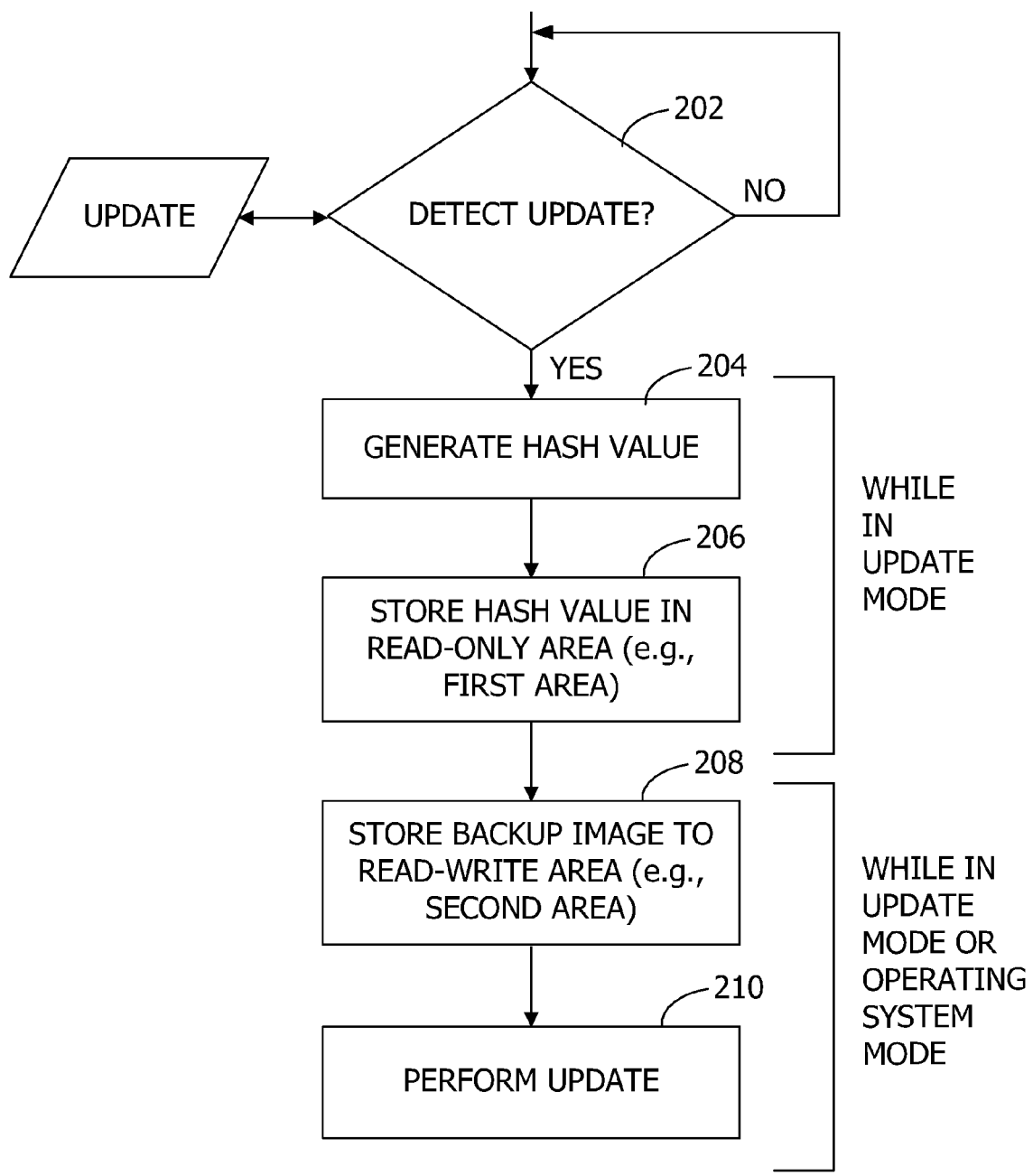
FIG. 2 illustrates an exemplary flow chart showing the saving a copy of an image along with a hash value corresponding to the image.

Referring next to FIG. 2, an exemplary flow chart shows the saving a copy of the image 110 along with a hash value corresponding to the image 110. At 202, if the availability of an update is detected, the computing device 104 is configured to enter the update mode. The availability of an update may be detected, for example, by detecting connection of the computing device 104 to another device providing the update, or by receiving a notification from a server such as server 410 in FIG. 4, or by other means within the scope of aspects of the invention.

While in the update mode, the first value 128 such as a hash value is generated at 204 based at least on at least a portion of the image 110 associated with the computing device 104. In an example in which the first value 128 is a hash value, the hash value is computed using SHA-1 algorithm. The generated value is stored at 206 in the first area 124 of the storage device 122. As described herein, the first area 124 becomes read-only after the computing device 104 exits the update mode. For example, the generated value is stored in an area of a flash drive that becomes read-only after the computing device 104 exits the update mode.

At 208, the backup image 130 is created from the image 110. The backup image 130 represents the entire image 110 (e.g., a full copy of the memory area 108), one or more partitions within the image 110, selected files stored on the computing device 104, or any portion of the image 110. The backup image 130 is written to the second area 126, or other read-write area. The computing device 104 executes in either the update mode or the operating system mode during the operation at 208. After the image 110, or a desired portion thereof, has been backed up, the update is performed at 210. The update may represent, for example, an updated operating system or application for execution on the computing device 104.

In some embodiments (not shown), an identifier of the image 110 is stored along with the first value 128 in the first area 124 while the computing device 104 is in the update mode. The identifier is used by applications (e.g., restore applications) to identify the image 110 that the backup image 130 should be associated with. The identifier helps prevent the backup image 130 from being restored to the wrong, unauthorized, or improper image by verifying the association between the backup image 130 and the image 110.

Figure 3:
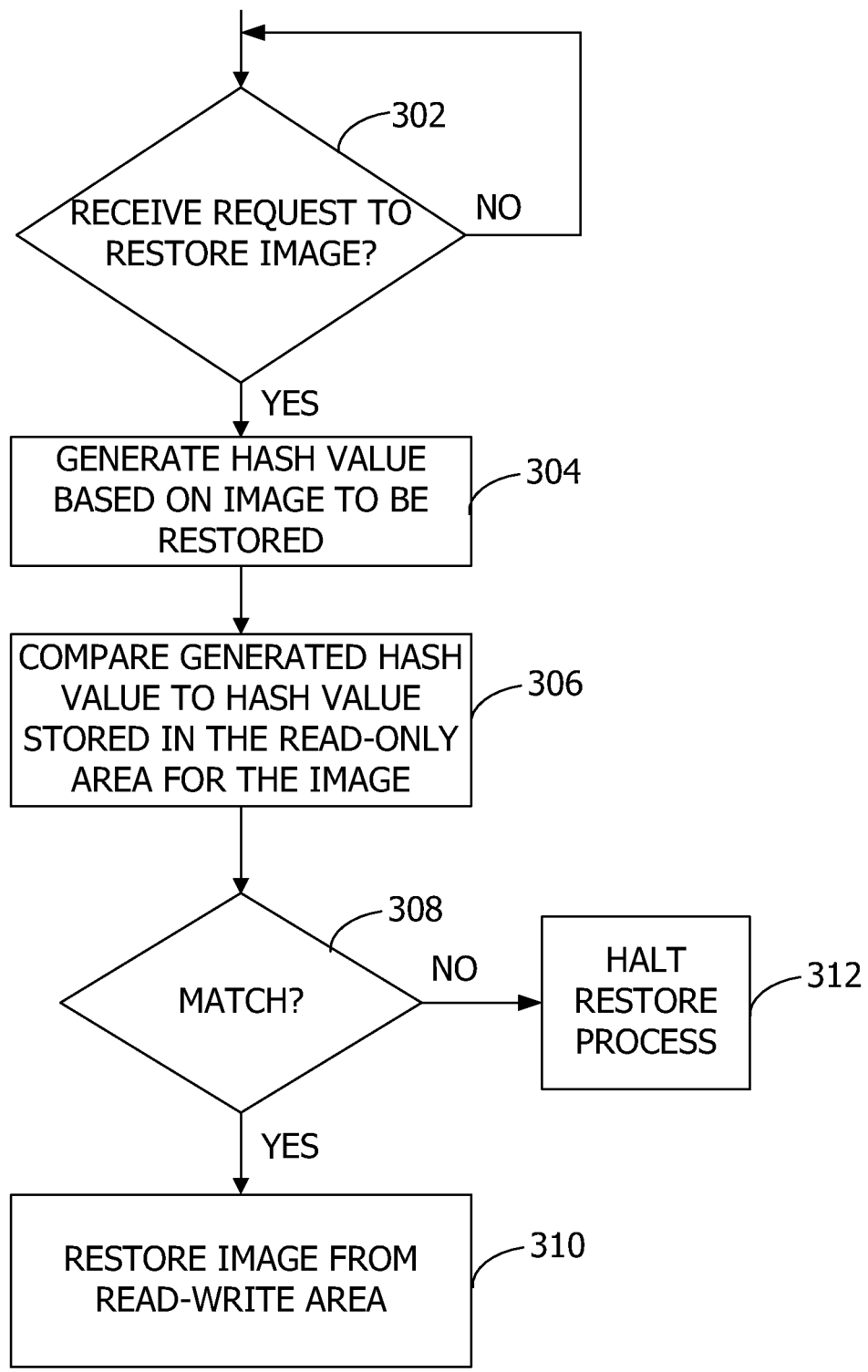
FIG. 3 illustrates an exemplary flow chart showing restoration of a backup image from a storage device based on validation of a hash value.

Referring next to FIG. 3, an exemplary flow chart shows restoration of the backup image 130 from the storage device 122 based on validation of a hash value. If a request to restore the backup image 130 is received at 302, the backup image 130 to be restored is accessed. The request is received subsequent to the creation and storage of the backup image 130 (e.g., as in FIG. 2). The request may be received by, for example, detecting coupling of the storage device 122 to the computing device 104, detecting the presence of an update for the computing device 104, or detecting a pressed key combination on the computing device 104.

A hash is performed at 304 based on the accessed backup image 130 to create a hash value (e.g., a second hash value, or second value). The hash value generated at 304 is compared at 306 to the hash value (e.g., first hash value, or first value 128) stored in the read-only area (e.g., first area 124) of the storage device 122. If the hash values match at 308, the backup image 130 is restored at 310. If the hash values do not match, the restore process ends at 312 without the backup image 130 being restored. Non-matching hash values indicate that the backup image 130 to be restored is not the original or unaltered backup image 130, and may be an unauthorized backup image 130 or malicious backup image 130. Rather, the backup image 130 has been altered, replaced, or otherwise modified.

Figure 4:
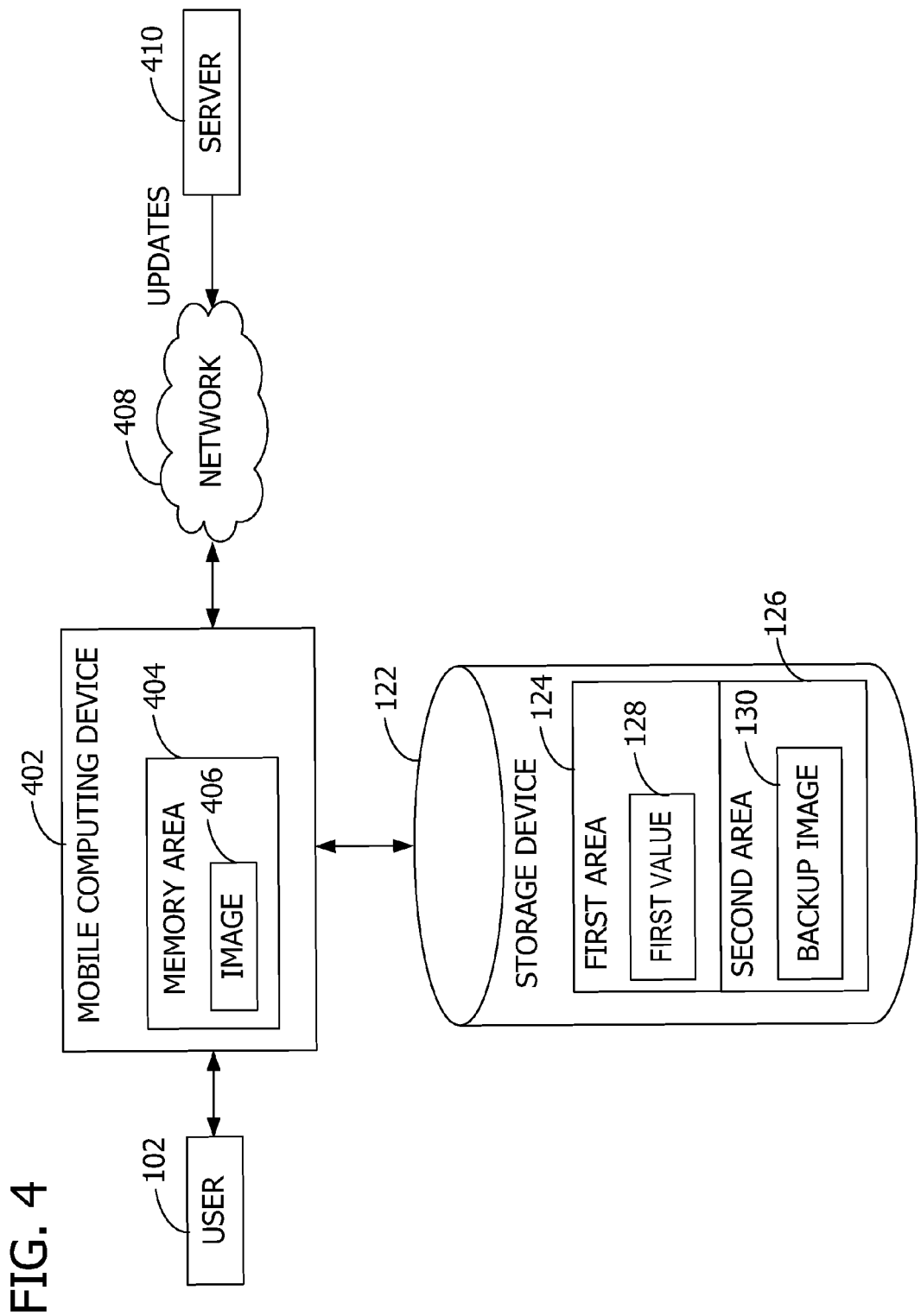
FIG. 4 illustrates an exemplary block diagram showing an update scenario involving a user, a mobile computing device, a storage device, and a server sending updates to the mobile computing device.

Referring next to FIG. 4, an exemplary block diagram shows an update scenario involving the user 102, a mobile computing device 402, the storage device 122, and a server 410 sending updates to the mobile computing device 402 via a network 408. In the example of FIG. 4, the server 410 provides an update to the mobile computing device 402. Similar to the operations illustrated in FIG. 3, upon receipt or notification of the available update, the mobile computing device 402 is configured to enter the update mode (e.g., reboot into the update mode). Prior to applying the update, the mobile computing device 402 creates the backup image 130 and stores the backup image 130 in the second area 126. The backup image 130 may be created and stored while the mobile computing device 402 is in the update mode, or while in the operating system mode. The backup image 130 represents a portion of the image 406 in a memory area 404 (e.g., the portion to which the update applies), or the entire image 406. A hash is performed using the backup image 130 as input, creating the first hash value. The first hash value is stored in the first area 124 on the storage device 122. The device 402 may send the contents of the second area 126 with the backup image 130 to the remote server 410 (or server cloud) that helps to minimize the amount of storage for protecting the first storage area 124 with the hash value on the device 402 or a trusted location.

In the example of FIG. 4, the update is then applied to the mobile computing device 402. Subsequently, if there is a desire to uninstall the update (e.g., a faulty update, or a misapplied update), the backup image 130 is restored using operations similar to those illustrated in FIG. 4. The restoration operations may be performed while the mobile computing device 402 is in the update mode or the operating system mode. The first hash value is retrieved from the second area 126 and compared to a second hash value generated from the backup image 130 to be restored. Based on this validation, the restore process proceeds or ends. If the validation is successful (the first hash value matches the second hash value), the restore process proceeds. If the validation is unsuccessful (the first hash value and the second hash value are different), the restore process ends.

Figure 5:
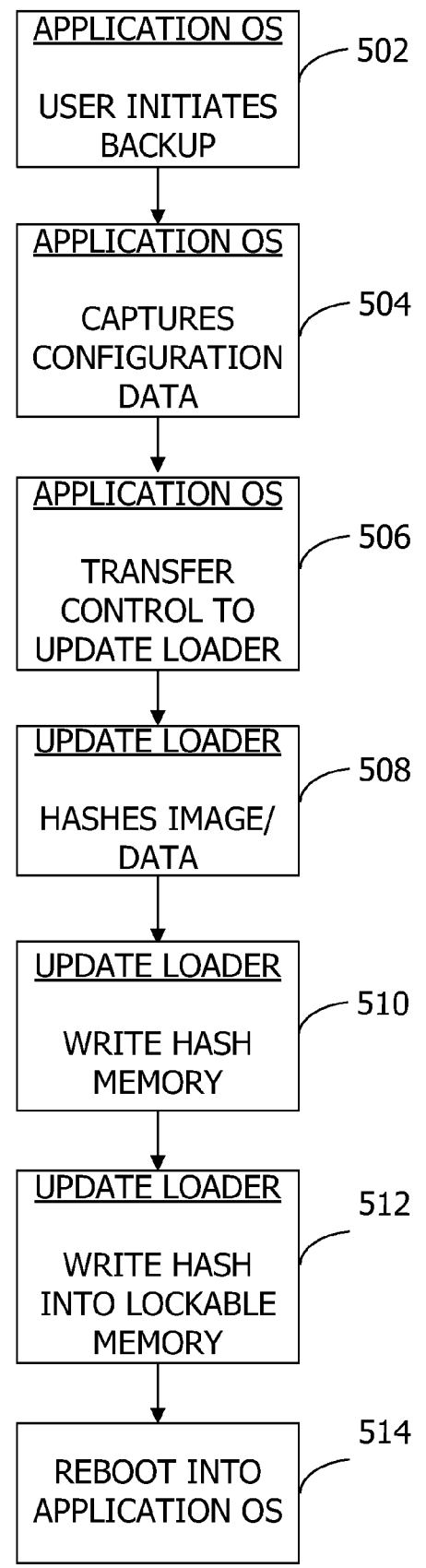
FIG. 5 illustrates an exemplary flow chart showing operation of an update loader for performing a backup.

Referring next to FIG. 5, an exemplary flow chart illustrates operation of an update loader for performing a backup. In some embodiments, the update loader is executed by an application in the main operating system invoking a specialized command that sets an update flag in memory or a storage location that is detectable by the platform after a reboot (e.g., and is used to determine whether or not to invoke the main operating system, or the update loader or other update operating system) followed by rebooting the computing device 104. Following the reboot, an initial program loader (IPL) examines an update flag. If the flag is set, the IPL executes the update loader, for example, by uncompressing the update loader (if compressed) into memory and jumping to the update loader execution code. The IPL leaves the first area 124 unlocked so that the first area 124 can be written to by the update loader.

At 502, the user 102 initiates the backup while the computing device 104 is in the operating system mode. Configuration data (e.g., partition data and the like) are captured at 504. Control is transferred to the update loader at 506. In some embodiments, the transfer of control occurs by configuring the computing device 104 to enter the update mode. The update loader hashes the image 110 at 508. A write hash memory operation occurs at 510. The hash is written into lockable memory at 512. At 512, the internal persistent storage area(s) of the device 104 are backed up to storage device 122 as backup image 130. The data may be compressed and/or encrypted using standard cryptography techniques such as Advanced Encryption Standard (AES)) before sending the data to the storage device 122. The storage areas may include one or more of the following: the operating system images, device unique identification information, radio and network code and configuration, user data such as documents and media files, and user settings.

The computing device 104 is rebooted into the operating system mode at 514.

Figure 6:
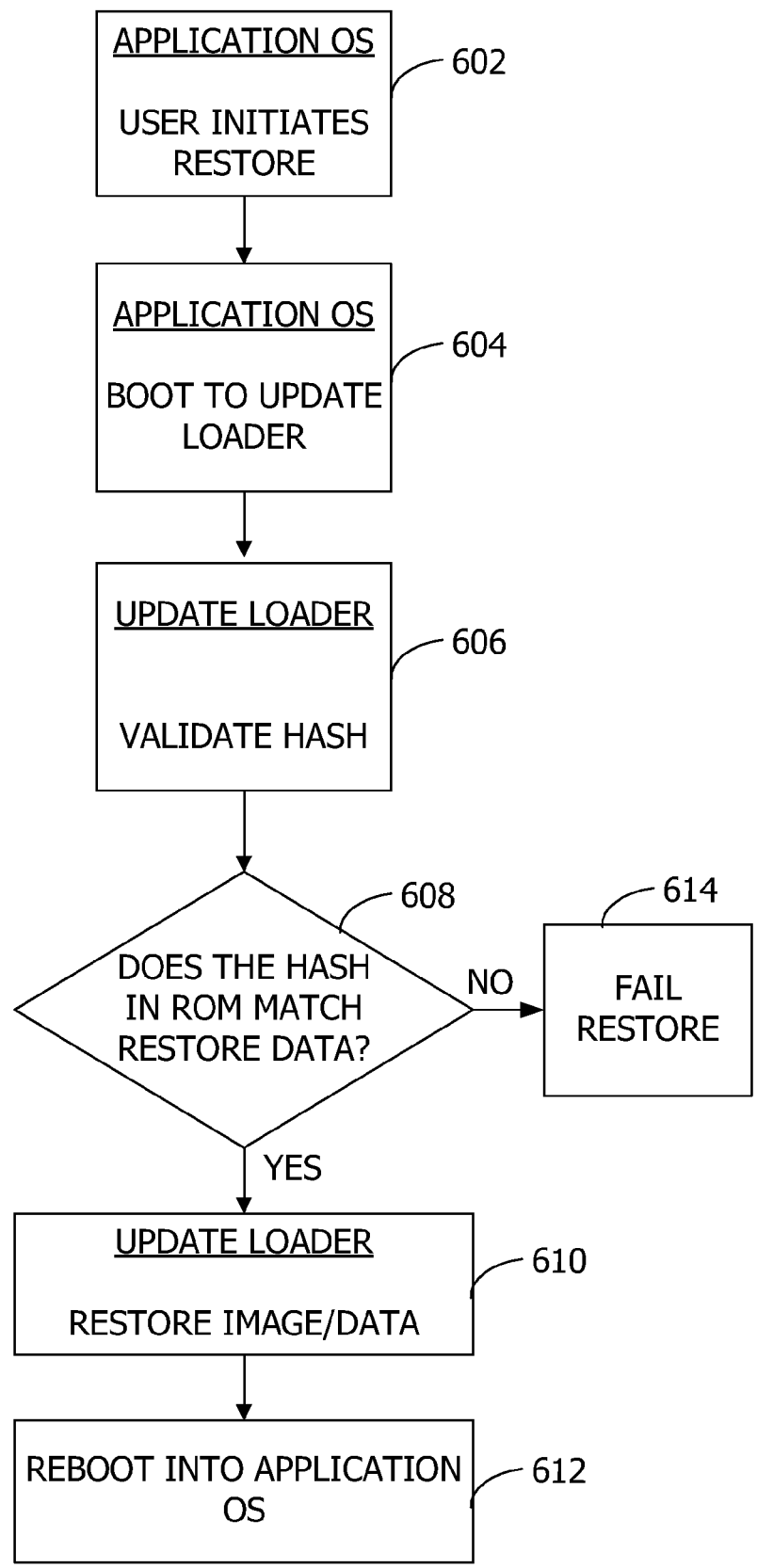
FIG. 6 illustrates an exemplary flow chart showing operation of an update loader for restoring a backup image.

Referring next to FIG. 6, an exemplary flow chart illustrates operation of an update loader for restoring the backup image 130. At 602, the user 102 initiates a restore operation while the computing device 104 is in the operating system mode. At 604, the computing device 104 reboots into the update loader. The update loader executes to perform the validation and restore operations. The hash is validated at 606 by examination of the image 130 to be restored (e.g., decrypting in some embodiments). Any device unique identification information stored in the backup image 130 may be used to ensure the backup image 130 was created by the specific device 104. In other embodiments, the device specific information may not be examined for scenarios such as replacing a failed device 104 with the backup image 130. In additional embodiments, the image 130 archived on the storage device 122 may be converted to a device agnostic image which can be restored to a replacement device. This image normalization process may include presenting the current device 104 serial number and a replacement device serial number that can be used as an index into data specific to the device 104 during manufacturing to identify the device specific attributes used to encrypt the image or key the backup image 130 to the device 104. These data values if known to a trusted entity can be used to exchange the backup between devices without the possibility of unexpected device data cloning. If the hash in the read-only memory (ROM) area matches at 608, the hash generated from the backup image 130 to be restored, the backup image 130 and/or configuration data is restored at 610. The computing device 104 reboots into the operating system mode at 612 (e.g., the application operating system).

If the hash in the ROM area does not match at 608 the hash generated from the backup image 130 to be restored, the restore fails at 614.

Figure 7:
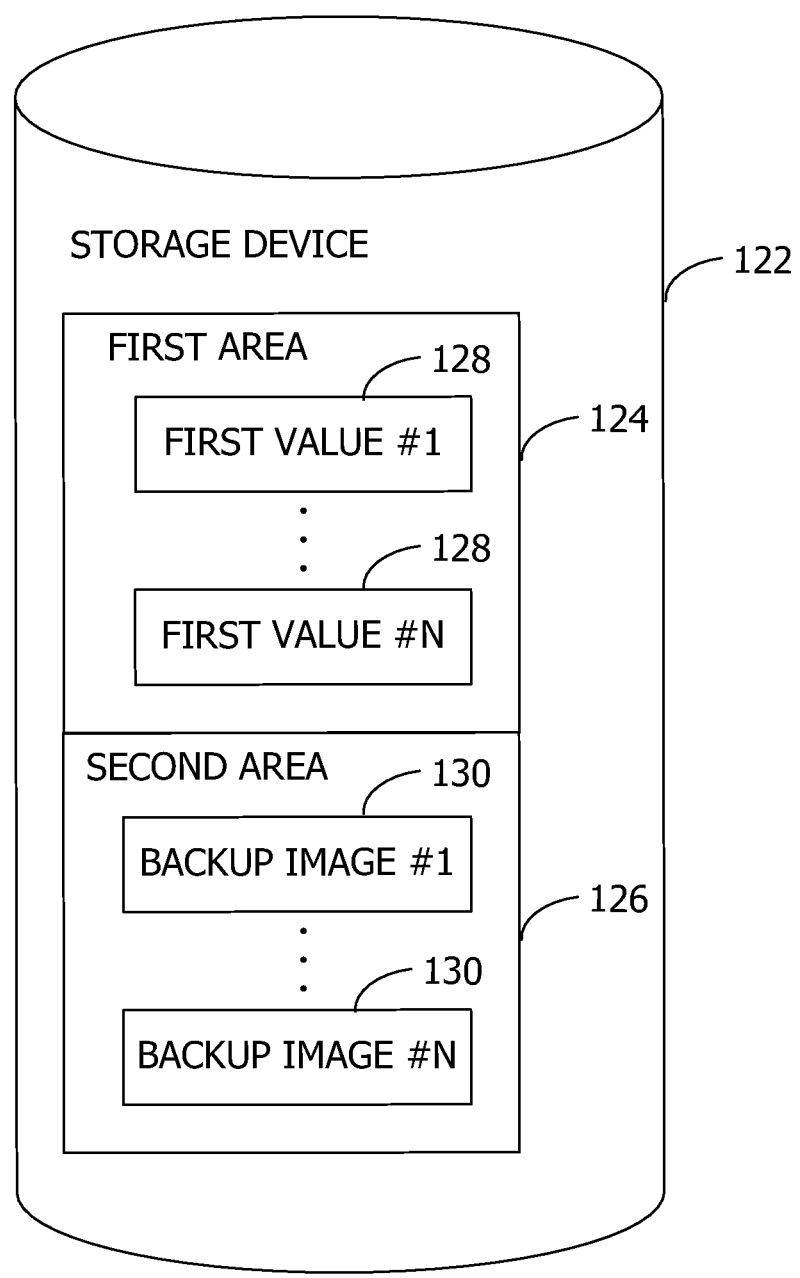
FIG. 7 illustrates an exemplary block diagram of a storage device storing a plurality of values (e.g., hash value) for a plurality of stored backup images.

Referring next to FIG. 7, an exemplary block diagram illustrates the storage device 122 storing a plurality of values (e.g., hash values or other authentication values) for a plurality of stored backup images 130. In the example of FIG. 7, the first area 124 of the storage device 122 stores a plurality of first values 128 such as value #1 through value #N. The second area 126 stores a plurality of backup images 130 such as backup image #1 through backup image #N. Each of the values corresponds to one of the backup images 130. In this example, the user 102 has stored copies of a plurality of versions of the image 110, or a plurality of portions of the image 110, or a combination thereof.

The memory component 112 accesses the first area 124 and the second area 126 on the storage device 122. The backup component 114 stores the plurality of backup images 130 in the second area 126. The backup component 114 also stores, in the first area 124, the plurality of values corresponding to the plurality of backup images 130. Each of the values is calculated based on the corresponding backup image 130. As in some of the other examples herein, the values are hash values or other authentication values.

Subsequently, the interface component 116 receives a request to restore one of the backup images 130. The boot component 118 configures the computing device 104 to enter the update mode responsive to the request received by the interface component 116. While in the update mode, the boot component 118 generates the authentication value based on the backup image 130 to be restored from the second area 126. The boot component 118 performs the same algorithm or particular calculation as was used to generate the values presently stored in the first area 124.

The validation component 120 compares the authentication value generated by the boot component 118 with the value, stored in the first area 124, corresponding to the backup image 130 to be restored. The backup component 114 restores the desired backup image 130 from the second area 126 to the computing device 104 based on the comparison performed by the validation component 120.

While aspects of the invention are described with reference to the computing device 104 being the mobile computing device 402 such as a mobile telephone, embodiments of the invention are operable with any computing device 104. For example, aspects of the invention are operable with devices such as laptop computers, gaming consoles, handheld or vehicle-mounted navigation devices, portable music players, and other devices.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for storing the first hash value in a memory area inaccessible to users 102 while the mobile computing device 402 is in operating system mode, and exemplary means for authenticating the portion of the image 110 with the first hash value during a restore operation.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for securely restoring image data on a mobile computing device, said mobile computing device having an update mode and an operating system mode, said system comprising:
    a memory area for storing an image associated with the mobile computing device; and
    a processor programmed to:
        configure the mobile computing device to enter the update mode, and within the update mode:
            generate a first hash value based on at least a portion of the image stored in the memory area;
            store the generated first hash value in a first area of a storage device, said first area being accessible by the processor for writing only when the mobile computing device is in the update mode, said first area becoming a read-only area upon the mobile computing device exiting the update mode, said first area being inaccessible for writing by any user when the mobile computing device is in the operating system mode, said storage device being communicatively coupled to the mobile computing device; and
            store an identifier of the image with the generated first hash value in the first area;
        store said portion of the image to a second area of the storage device, said second area being accessible by the processor for writing when the mobile computing device is in the update mode or the operating system mode; and
        subsequently configure the mobile computing device to enter the update mode, and within the update mode:
            retrieve the first hash value from the first area of the storage device responsive to a request to restore the portion of the image stored in the second area;
            generate a second hash value based on the portion of the image stored in the second area;
            compare the retrieved first hash value with the generated second hash value; and
            restore the portion of the image from the storage device to the memory area based on the comparison between the first hash value and the second hash value, wherein the identifier prevents restoration of an unauthorized image to the mobile computing device based on a verification of an association between the image and the stored portion of the image.

2. The system of claim 1, wherein an update loader executes while the mobile computing device is in the update mode.

3. The system of claim 1, wherein the processor is programmed to configure the mobile computing device to enter the update mode by re-booting the mobile computing device, an initial program loader examining an update flag following the re-booting to enter the update mode.

4. The system of claim 1, wherein the storage device comprises removable storage media.

5. The system of claim 1, wherein said portion of the image represents one or more of the following: operating system data, application data, and user data.

6. The system of claim 1, further comprising means for storing the first hash value in a memory area inaccessible to users while the mobile computing device is in operating system mode.

7. The system of claim 1, further comprising means for authenticating the portion of the image with the first hash value during a restore operation.

8. A method comprising:
    defining a computing device to have an operating system mode and an update mode, said computing device being communicatively coupled to a storage device, said storage device having at least a first area and a second area, said first area being accessible by the computing device for writing only when the computing device is in the update mode, said first area becoming a read-only area upon the mobile computing device exiting the update mode, said first area being inaccessible for writing by any user when the computing device is in the operating system mode, said second area being accessible by the computing device for writing when the computing device is in the update mode or the operating system mode;

configuring the computing device to enter the update mode to:
  generate a first value based on at least a portion of an image associated with the computing device;
  store the generated first value in the first area;
  store an identifier of the image with the generated first value in the first area;

storing said at least a portion of the image to the second area;

subsequently receiving a request to restore the portion of the image;

configuring the computing device to enter the update mode to:
  retrieve the first value stored in the first area responsive to the received request;
  generate a second value based on the portion of the image stored in the second area;
  compare the retrieved first value with the generated second value; and
  restore the portion of the image from the second area to the computing device based on the comparison between the first value and the second value, wherein the identifier prevents restoration of an unauthorized image to the computing device based on a verification of an association between the image and said portion of the image.

9. The method of claim 8, wherein generating the first value comprises generating one or more of the following: a hash value, a checksum value, and a cyclic redundancy check (CRC) value.

10. The method of claim 8, wherein receiving the request to restore the portion of the image comprises one or more of the following: detecting coupling of the storage device to the computing device, detecting the presence of an update for the computing device, and detecting a pressed key combination on the computing device.

11. The method of claim 8, further comprising storing configuration data related to the portion of the image.

12. The method of claim 8, wherein storing said at least a portion of the image comprises storing one or more partitions of the image.

13. The method of claim 8, wherein said portion of the image represents one or more of the following: operating system data, application data, and user data.

14. The method of claim 8, further comprising applying an update to the computing device after generating the first value, storing the generated first value in the first area, and storing said at least a portion of the image to the second area.

15. The method of claim 8, wherein storing the generated first value in the first area comprises storing the generated first value in a read-only portion of a flash drive connected to the computing device.

16. One or more computer storage memories storing computer-executable components, said components executing on a computing device having an update mode and an operating system mode, said components comprising:

a memory component for accessing a first area and a second area on a storage device, said storage device being communicatively coupled to the computing device, said first area being accessible by the computing device for writing only when the computing device is in the update mode, said first area becoming read-only upon the computing device exiting the update mode, said first area being inaccessible for writing by any user when the computing device is in the operating system mode, said second area being accessible by the computing device for writing when the computing device is in the update mode or the operating system mode;

a backup component for storing a plurality of backup images in the second area, said backup component further storing a plurality of values, in the first area, corresponding to the plurality of backup images, each of said values being calculated based on the corresponding backup image, said backup component further storing an identifier of one of the backup images of the plurality of backup images with the plurality of values in the first area;

an interface component for receiving a request to restore said one of the backup images;

a boot component for configuring the computing device to enter the update mode responsive to the request received by the interface component to generate an authentication value based on said one of the backup images; and a validation component for comparing, while the computing device is in the update mode, the authentication value generated by the boot component with a value, from the plurality of values stored in the first area, corresponding to said one of the backup images; wherein the backup component restores said one of the backup images to the computing device based on the comparison performed by the validation component, wherein the identifier prevent restoration of an unauthorized image to the computing device based on a verification of an association between said plurality of backup images and said one of the backup images.

17. The computer storage memories of claim 16, wherein the backup component restores said one of the backup images if the authentication value generated by the boot component matches the value, from the plurality of values stored in the first area, corresponding to said one of the backup images.

18. The computer storage memories of claim 16, wherein the backup component halts restoring if the authentication value generated by the boot component does not match the value, from the plurality of values stored in the first area, corresponding to said one of the backup images.

19. The computer storage memories of claim 16, wherein all users of the computing device have equal access privileges to data stored on the storage device.

20. The computer storage memories of claim 16, wherein the backup images correspond to one or more of the following: a full copy of memory associated with the computing device, a partition of memory associated with the computing device, and selected files stored on the computing device.

* * * * *